Nov. 16, 1948.    W. MacWILLIAM    2,453,997
FITTING FOR FLEXIBLE HOSE
Filed May 2, 1946    2 Sheets-Sheet 1

INVENTOR.
WALLACE MacWILLIAM
BY
ATTORNEYS

Nov. 16, 1948. W. MacWILLIAM 2,453,997
FITTING FOR FLEXIBLE HOSE
Filed May 2, 1946 2 Sheets-Sheet 2
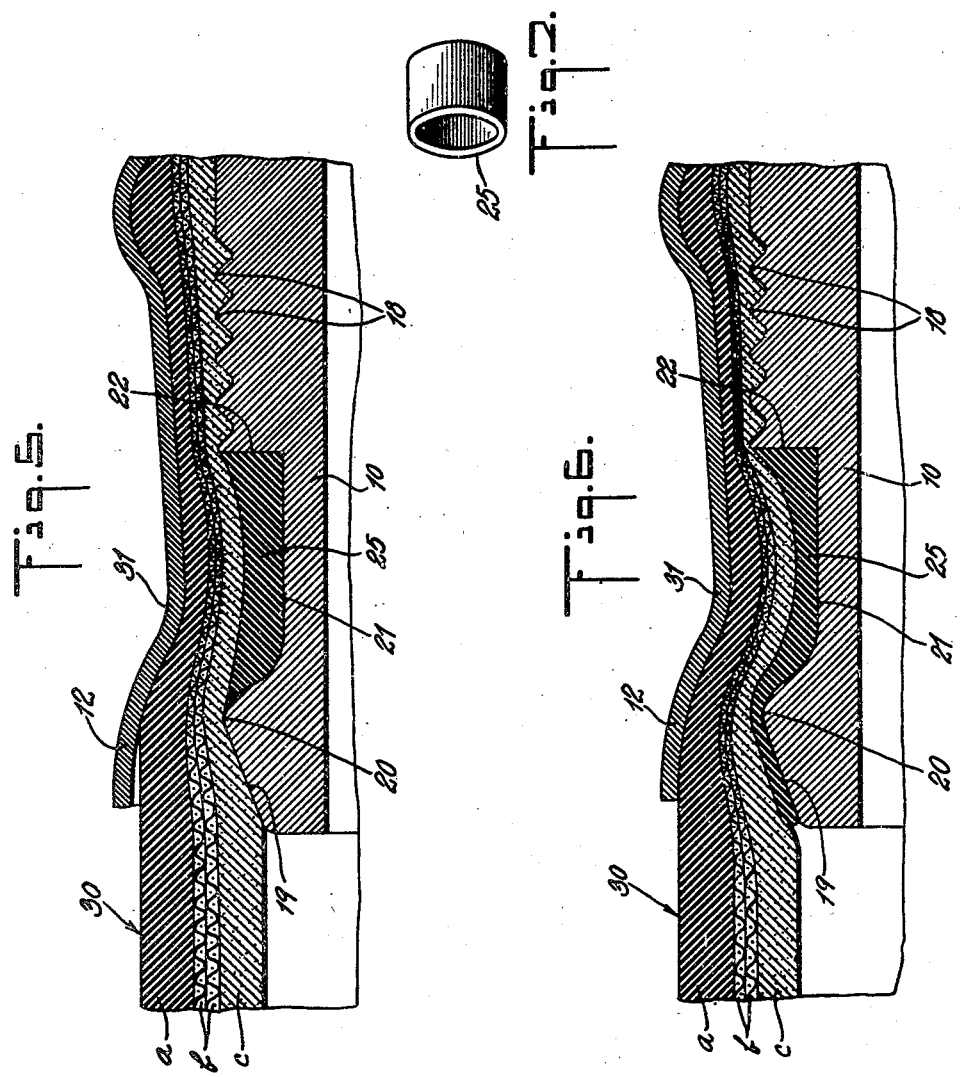
INVENTOR.
WALLACE MacWILLIAM
BY
ATTORNEYS Patented Nov. 16, 1948

2,453,997

UNITED STATES PATENT OFFICE 2,453,997

FITTING FOR FLEXIBLE HOSE

Wallace MacWilliam, Lake Valhalla, N. J., assignor to Resistoflex Corporation, Belleville, N. J., a corporation of New York Application May 2, 1946, Serial No. 666,645

8 Claims. (Cl. 285—84)

This invention relates to fittings for flexible hose, more particularly to that kind of fitting which is permanently attached to the hose and serves to connect it to apparatus with which it is used.

It has been particularly difficult to use flexible hose with certain fluids, notably those used in modern refrigeration equipment, for example methyl chloride, due to the fact that leaks have occurred where the hose has been attached to fittings. One cause of such leaks has been discovered to be cold flow of the inner lining of the hose where it is in contact with the shank of the fitting.

The principal object of the invention is to provide fittings for such difficult applications which are entirely leakproof. The fittings of the invention are particularly well adapted for use in hose having an inner wall or lining of compar (compounded polyvinyl alcohol), such as that disclosed in Patent No. 2,053,112, which is admirably suited for use with refrigerants and is of a tougher consistency than flexible rubber or synthetic rubber, but the invention is not restricted to use with such hose. This invention renders the connection between such hose and fittings leakproof even though there is a slight tendency to cold flow on the part of the lining when subjected to pressure.

Other objects and advantages will in part appear and in part be obvious from the following detailed description of the present preferred embodiments of the invention, taken in conjunction with the drawings in which:

Fig. 5 is a greatly enlarged section through the outer end of a finished fitting, embracing one side of the hose wall, and showing one condition of the resilient sleeve;

Fig. 6 is a view like Fig. 5 showing the resilient sleeve under greater compression and squeezed out over the end of the shank; and Fig. 7 is a perspective view of the resilient sleeve.

Figure 1:
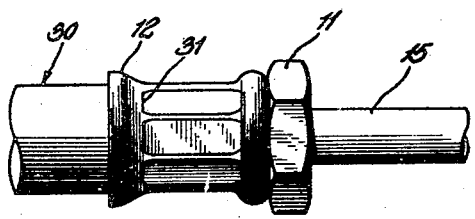
Fig. 1 shows a completed fitting attached to a hose end and connected to a pipe.
Figure 2:
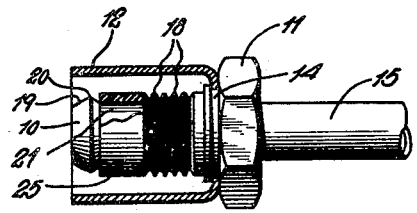
Fig 2 is a similar view, the ferrule being shown in central section and before crimping, the sleeve of resilient material around the shank being shown partly broken away.

Referring to Figs. 1 and 2, the fitting of the invention has, in common with many other fittings, a shank 10 for insertion in the hose end, a hex head 11 for application of a wrench and a ferrule 12 which surrounds the outside of the hose end and is adapted to be contracted radially thereon. In the embodiment shown, the ferrule is of the locked type, having its inner end contracted into a circumferential groove 14 at the rear end of the shank. This construction is preferred but the invention is equally applicable to fittings in which the shank and ferrule are integral or in which they are neither integral nor locked.

The fitting is shown as connected to a pipe 15 which is fastened, as by soldering, in a counterbore 16 in the nut 11 but it will be understood that this is but one way of attaching the fitting to some other conduit and may take a variety of forms including a threaded bore in or a nipple on the nut and the like.

The invention resides in the particular form of the shank, in the association therewith of a compressible sleeve and in the manner in which the ferrule is contracted with relation thereto.

Figure 3:
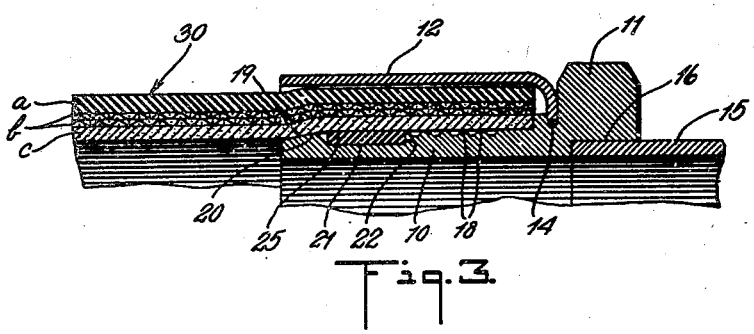
Fig. 3 is an enlarged section through one side of the wall of the hose and before crimping of the ferrule.
Figure 4:
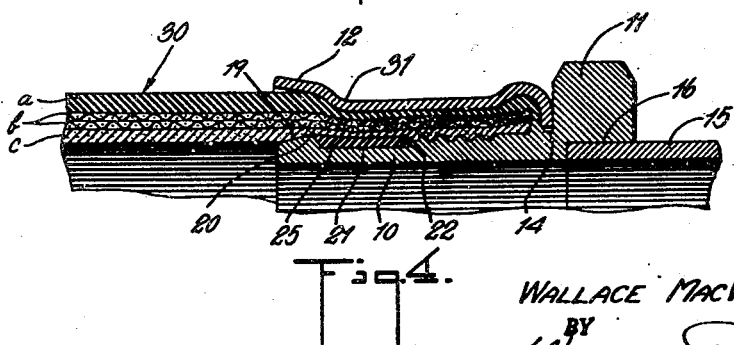
Fig. 4 shows the same parts as in Fig. 3 after crimping.

Referring to Figs. 2 and 3, the shank 10 is provided at its inner end with serrations or annular ridges 18 for gripping the inside of the hose when the ferrule is contracted. The forward end of the shank has a conical taper at 19, terminating at 20 at which point the shank is of substantially the same outside diameter as at the high points of the ridges 18. Inwardly of the annular ridge 20 the shank slopes toward the bottom of a relatively wide circumferential groove 21 at the rear end of which is a square shoulder 22.

A cylindrical resilient sleeve 25 (Fig. 7) is seated in the groove 21 by being pushed over the ridge 20 and it rests at its inner end against shoulder 22. Sleeve 25 is of a thickness corresponding approximately to the depth of the groove 21 in which it is seated. The sleeve 25 is made of a resilient rubber-like material, the specific composition of which will depend on the fluids to be conveyed by the hose and on the hardness of the hose lining. With most refrigerants a synthetic rubber such as neoprene or Perbunan has been found most satisfactory. When contacted by methyl chloride or the like these materials tend to swell, which is advantageous for reasons which will appear later.

With the parts arranged as shown in Fig. 2, the fitting is then forced onto the end of a hose 30. The hose shown in the drawing is one having multiple layers, for example an outer cover a of rubber or neoprene, a double layer of braid b, and a liner c of compar. The outside diameter of the shank 10 should be slightly larger than the inside diameter of the hose so as to expand it slightly on insertion.

The relative hardness of the hose liner c and the sleeve 25 is of importance in this respect, that the sleeve should be of no greater and preferably of lower durometer than the liner so as to flow to a greater extent than the liner when the entire assembly is put under pressure by the crimping of the ferrule.

The ferrule 12 is crimped in the usual way in a crimping machine having a plurality of radial dies but it is important that the outer end of the crimp at 31 should be intermediate the ends of the groove 21 and sleeve 25. Preferably the crimp is slightly tapered so that the point of maximum pressure is about at the point 31.

Comparing Figs. 2 and 3, it will be seen that the crimping of the ferrule 12 has the effect of spreading the sleeve 25 longitudinally in groove 21 so that its forward end is forced up the slope behind the ridge 20, squeezing the forward edge of the sleeve out to a feather edge between the ridge 20 and the hose liner c, as best shown in Fig. 5. This forms a very effective type of seal as any fluid under pressure in the hose which creeps up the slope 19 between the hose and the shank and gets under this feather edge will force it more tightly against the hose lining. Endwise fluid pressure on sleeve 25 toward the base of the fitting will also act to thicken the sleeve 25, forcing it more tightly against the shank 10 and the hose lining, increasing the sealing effect.

Fig. 6 represents the condition of the sleeve 25 when the ferrule 12 is contracted slightly more than in Fig. 5 so that the sleeve 25 is actually extruded out over the end of the shank 10, flowing under pressure along the sloping surface 19 and exposing its forward edge to the fluid in hose 30. This likewise provides a very good seal.

Whether the condition shown in Fig. 5 or in Fig. 6 exists, it is evident that no fluid can leak past sleeve 25 without coming into intimate contact with it. Where the fluid has the capacity to swell the material of the sleeve, as in the case of methyl chloride and neoprene, for example, this swelling action will serve to further seal the junction between the hose and the fitting against leakage, the swelling action increasing the effective size of the sleeve 25.

In actual use the fitting described above has been shown to be highly effective in handling refrigerant fluids under actual conditions of use, including operation under temperatures up to 250–260° F., without any leaking.

It will be understood that many of the details herein set forth are merely illustrative of the invention which is to be construed broadly within the purview of the claims.

What is claimed is:

1. In a hose assembly, a fitting comprising a ferrule surrounding the hose end, a shank inserted in the hose end, said shank having a circumferential external cylindrical recess behind its forward end, a cylindrical sleeve of extendable material substantially filling and lying wholly within said recess before being compressed, said ferrule being radially compressed upon the hose end and around said sleeve.

2. In a hose assembly, a fitting comprising a ferrule surrounding the hose end, a shank inserted in the hose end, said shank having a circumferential external cylindrical recess behind its forward end, a cylindrical sleeve of resilient material of lower durometer than the hose lining substantially filling said recess before being compressed, said ferrule being radially compressed upon the hose end and around said sleeve.

3. In a hose assembly, a fitting comprising a ferrule surrounding the hose end, a shank inserted in the hose end, said shank having a circumferential external cylindrical recess behind its forward end, the rear end of said recess terminating in a square shoulder and the forward end of said recess sloping upwardly toward the forward end of the shank, a cylindrical sleeve of resilient material substantially filling said recess before being compressed, said ferrule being radially compressed upon the hose end and around said sleeve.

4. In a hose assembly, a fitting comprising a ferrule surrounding the hose end, a shank inserted in the hose end, said shank having a circumferential external recess behind its forward end, the forward wall of said recess sloping upwardly toward the forward end of the shank, a sleeve of resilient material substantially filling said recess before being compressed, said ferrule being radially compressed upon the hose end with the area of compression terminating intermediate the ends of said sleeve, said sleeve being extended by said compression at least over the said forward sloping wall of said recess and into intimate engagement with the inside of the hose.

5. In a hose assembly, a fitting comprising a ferrule surrounding the hose end, a shank inserted in the hose end, said shank having a circumferential external recess behind its forward end, the forward end of said shank having a double slope terminating at the forward bottom edge of said recess, a sleeve of resilient material substantially filling said recess before being compressed, said ferrule being radially compressed upon the hose end, with the area of compression terminating intermediate the ends of said sleeve, said sleeve being longitudinally extended by said compression over the double sloped end of said shank and between it and the lining of said hose.

6. In a flexible hose assembly for conducting fluid under pressure capable of swelling but not disintegrating a rubber-like resilient compound, a fitting comprising a ferrule surrounding the hose end, a shank inserted in the hose end, said shank having a circumferential external recess behind its forward end, the forward edge of said recess sloping upwardly toward the forward end of said shank, a sleeve of extendable material capable of swelling on contact with said fluid substantially filling said recess before being compressed, said ferrule being radially contracted upon said hose end and on said sleeve, said sleeve being extended by said compression along the sloping end of said recess and over the forward end of said shank into contact with the fluid in the hose.

7. In a flexible hose assembly for conducting fluid under pressure, a fitting comprising a ferrule surrounding the hose end and radially compressed thereon, a shank inserted in the hose end, said shank having an external recess adjacent its forward end, a sleeve of extendable material lying wholly within said recess before compression and compressed between said shank and the lining of said hose, said sleeve being of material capable of swelling on contact with the fluid in said hose, whereby fluid passing between the hose lining and the end of said shank will contact said sleeve and cause it to swell, thus sealing the fitting against escape of fluid.

8. In a hose assembly of the type wherein a fitting is permanently secured to the end of the hose, said fitting comprising a shank inserted in the hose end and a ferrule radially compressed upon the outside of the hose end, the improvement which consists in forming said shank with a circumferential external recess intermediate its ends, a sleeve of extendable material at least as soft as the lining of the hose substantially filling and lying wholly within said recess prior to compression of said ferrule, said ferrule being radially compressed at least in the area overlying said sleeve, said sleeve being extended by said compression longitudinally of said shank.

WALLACE MacWILLIAM.

REFERENCES CITED

The following references are of record in the file of this patent:

UNITED STATES PATENTS

| Number | Name | Date |
| --- | --- | --- |
| 746,497 | Greenfield | Dec. 8, 1903 |
| 1,808,094 | Yackey | June 2, 1931 |
| 2,053,112 | Schnabel | Sept. 1, 1936 |
| 2,121,624 | Cawles | June 21, 1938 |
| 2,181,673 | Tompkins | Nov. 28, 1939 |